United States Patent
Bellmyer et al.

(12)

(10) Patent No.: US 12,015,220 B2
(45) Date of Patent: Jun. 18, 2024

(54) POWER CONNECTOR WITH GRIPPING SLIPS FOR ELECTRICAL SUBMERSIBLE PUMP

(71) Applicant: Baker Hughes Oilfield Operations LLC, Houston, TX (US)

(72) Inventors: Mark Bellmyer, Tulsa, OK (US); Joseph Fairconeture, Tulsa, OK (US); Allen Saunders, Claremore, OK (US)

(73) Assignee: BAKER HUGHES OILFIELD OPERATIONS, LLC, Houston, TX (US)

( * ) Notice: Subject to any disclaimer, the term of this patent is extended or adjusted under 35 U.S.C. 154(b) by 581 days.

(21) Appl. No.: 17/232,928

(22) Filed: Apr. 16, 2021

(65) Prior Publication Data

US 2021/0328377 A1    Oct. 21, 2021

Related U.S. Application Data

(60) Provisional application No. 63/011,748, filed on Apr. 17, 2020.

(51) Int. Cl.
   *H01R 13/40*    (2006.01)
   *E21B 17/02*    (2006.01)
   (Continued)

(52) U.S. Cl.
   CPC .......... *H01R 13/40* (2013.01); *E21B 17/028* (2013.01); *E21B 43/128* (2013.01); *F04D 13/08* (2013.01);
   (Continued)

(58) Field of Classification Search
   CPC ...... H01R 13/40; H01R 13/04; H01R 13/523; E21B 17/028; E21B 43/128; F04D 13/08; H02K 5/132; H02K 5/225
   See application file for complete search history.

(56) References Cited

U.S. PATENT DOCUMENTS

| | | |
|---|---|---|
| 3,970,355 A | 7/1976 | Pitschi |
| 4,679,875 A | 7/1987 | Ramsey |

(Continued)

FOREIGN PATENT DOCUMENTS

| | | |
|---|---|---|
| CN | 1354537 A | 6/2002 |
| KR | 200192611 Y1 | 8/2000 |

OTHER PUBLICATIONS

International Preliminary Report on Patentability, Application No. PCT/US2021/027962, dated Oct. 27, 2022.

(Continued)

*Primary Examiner* — Edwin A. Leon
(74) *Attorney, Agent, or Firm* — BRACEWELL LLP; Keith R. Derrington

(57) ABSTRACT

A motor lead for an electrical submersible well pump motor has three insulated conductors wrapped with a metal armor. A power connector has a housing with an upper opening into which the motor lead and a lower portion of the armor extend. The housing has an interior with a converging upper portion converging toward the upper opening. A slips member is located in the interior of the housing and has an upper opening into which the lower portion of the armor extends. The slips member has fingers that are wedged into the converging upper portion of the housing, which causes the fingers to deflect into the armor.

20 Claims, 2 Drawing Sheets

(51) Int. Cl.

| | | |
|---|---|---|
| | *E21B 43/12* | (2006.01) |
| | *F04D 13/08* | (2006.01) |
| | *H01R 13/04* | (2006.01) |
| | *H02K 5/132* | (2006.01) |
| | *H02K 5/22* | (2006.01) |

(52) U.S. Cl.
CPC ............ *H01R 13/04* (2013.01); *H02K 5/132* (2013.01); *H02K 5/225* (2013.01)

(56) References Cited

U.S. PATENT DOCUMENTS

| | | |
|---|---|---|
| 5,700,161 A | 12/1997 | Plummer et al. |
| 6,331,123 B1 | 12/2001 | Rodrigues |
| 6,705,884 B1 * | 3/2004 | McCarthy .............. H01R 9/053 439/427 |
| 6,796,829 B1 * | 9/2004 | McCarthy .............. H01R 9/053 439/394 |
| 6,890,208 B2 * | 5/2005 | McCarthy .............. H01R 9/053 439/394 |
| 7,789,689 B2 | 9/2010 | Frey et al. |
| 8,512,074 B2 | 8/2013 | Frey |
| 10,224,669 B1 | 3/2019 | Tanner |
| 2008/0064269 A1 | 3/2008 | Parmeter et al. |

OTHER PUBLICATIONS

International Search Report and Written Opinion of PCT Application No. PCT/US2021/027962 dated Jul. 21, 2021: pp. 1-9.

* cited by examiner

POWER CONNECTOR WITH GRIPPING SLIPS FOR ELECTRICAL SUBMERSIBLE PUMP

CROSS-REFERENCE TO RELATED APPLICATION

This application claims priority to provisional patent application Ser. No. 63/011,748, filed Apr. 17, 2020.

FIELD OF THE DISCLOSURE

This disclosure relates in general to power cable connectors for electrical submersible well pumps, and in particular to a connector that has griping slips for gripping the motor lead extension.

BACKGROUND

Electrical submersible well pumps (ESP) are often used to pump liquids from hydrocarbon producing wells. A typical ESP includes a pump driven by an electrical motor. Production tubing, which comprises pipes having threaded ends secured together, supports the ESP in most installations. The pump normally pumps well fluid into the production tubing. A power cable extends alongside the production tubing to the motor for supplying power.

In one type of ESP, the power cable has on a lower end a splice that connects it to a motor lead or motor lead extension. The motor lead extends alongside the ESP and has a motor connector or pothead on its lower end that connects to an upper end of the motor to supply power. The motor lead may have three insulated conductors bundled side-by-side, one for each phase of power being supplied. An outer armor strip wraps around the three insulated conductors. Some motor leads have lead sheaths around each insulated conductor to resist damage from hydrogen sulfide that may be produced in the well.

A variety of motor power connectors are known. In most types, each of the three power conductors extends into a housing and joins a motor wire. The housing may be in two parts, an upper housing and a lower housing. Various insulator arrangements electrically insulate the electrical terminals of the conductors. In many types, an epoxy filler is dispensed around the power conductors in the power connector housing.

While these work well, there are manufacturing disadvantages to using epoxy. The process takes hours to cure to epoxy. If the connector fails a factory acceptance test after manufacturing, the connector cannot be easily dissembled. If a motor lead failure occurs during operation of the ESP, it is difficult to perform a failure analysis of the power connector because the epoxy makes it difficult to disassemble. Also, refurbishing a previously used power connector for re-use requires removal of the epoxy, a difficult task.

SUMMARY

An electrical power apparatus for an electrical submersible well pump motor comprises a motor lead having three side-by-side insulated conductors and a metal strip of armor that wraps around the insulated conductors. A power connector secured to a lower end of the motor lead engages a receptacle on the motor. The power connector has a housing having an upper opening into which the motor lead and a lower portion of the armor extend. At least one electrical insulator in the housing has a plurality of holes, each receiving one of the insulated conductors. A slips member is in engagement with the housing. The slips member has an upper opening into which the lower portion of the armor extends. The slips member has a plurality of fingers with inward protruding teeth that are deflected into gripping engagement with the armor.

In the embodiment shown, the upper opening of the slips member has two flat sides that face each other. The fingers are located in both of the flat sides.

The slips member may be located within an interior of the housing. In the embodiment shown, the housing has an interior with a converging upper portion converging toward the upper opening of the housing. The fingers of the slips member are wedged into the converging upper portion, which causes the fingers to deflect into the armor.

The converging upper portion of the housing may have two converging side wall surfaces that face and converge toward each other in a direction toward the upper opening of the housing. The slips member has two side wall surfaces that are in flush engagement with the converging side wall surfaces of the housing. The fingers are located in the side wall surfaces of the slips member. Downward movement of the housing over the slips member causes the fingers to deflect inward into engagement with the armor.

The converging side wall surfaces of the housing and the side wall surfaces of the slips member may be flat. The upper opening of the slips member may be oblong.

The slips member has a lower opening through which the insulated conductors extend. In the embodiment shown, the lower opening is circular.

DETAILED DESCRIPTION OF THE DISCLOSURE

Figure 1:
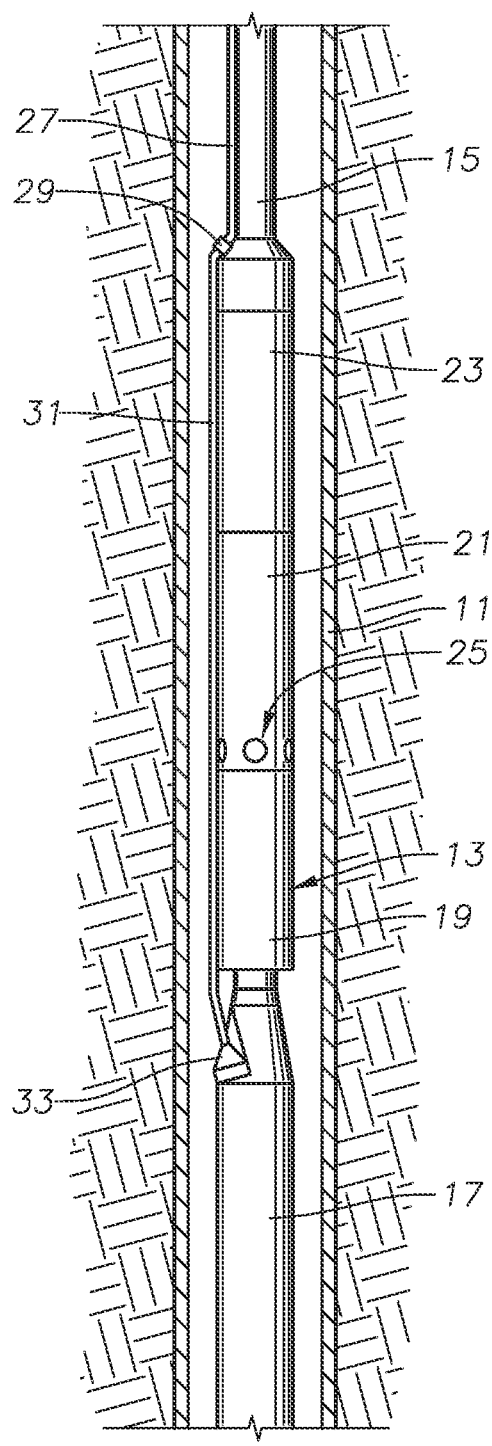
FIG. 1 is a schematic side view of an electrical submersible pump assembly suspended in a well and having an electrical motor connector in accordance with this invention.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude. The terms "upper", "lower" and the like are used only for convenience as the ESP may be operated in positions other than vertical.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a cased well 11 has downhole equipment comprising an electrical submersible pumping assembly (ESP) 13, which is disposed on a string of production tubing 15. ESP 13 includes an electric motor 17, a seal section 19, an optional gas separator 21, and a pump 23. Motor 17 is normally a three-phase AC type filled with a dielectric lubricant. A pressure equalizer, which may be a part of seal section 19, reduces a pressure differential between the dielectric lubricant and well fluid on the exterior of motor 17. Pump 23 may comprise a centrifugal pump or another type, such as a progressing cavity pump or a positive displacement pump. Fluid inlets 25 on separator 21 provide a passage for receiving fluid in pump 23. If a gas separator is not used, fluid inlets 25 would be at the lower end of pump 23.

A power cable 27 extends downhole alongside tubing 15, terminating in a splice or connection 29 that electrically couples power cable 27 to a motor lead or motor lead extension 31, which may be considered to be part of power cable 27. Motor lead 31 has a motor power connector or pothead 33 on its lower end that electrically connects and secures motor lead 31 to a receptacle near the upper end of motor 17. Alternately, power cable 27 can extend all the way from the surface to power connector 33, eliminating the need for splice 29.

Figure 2:
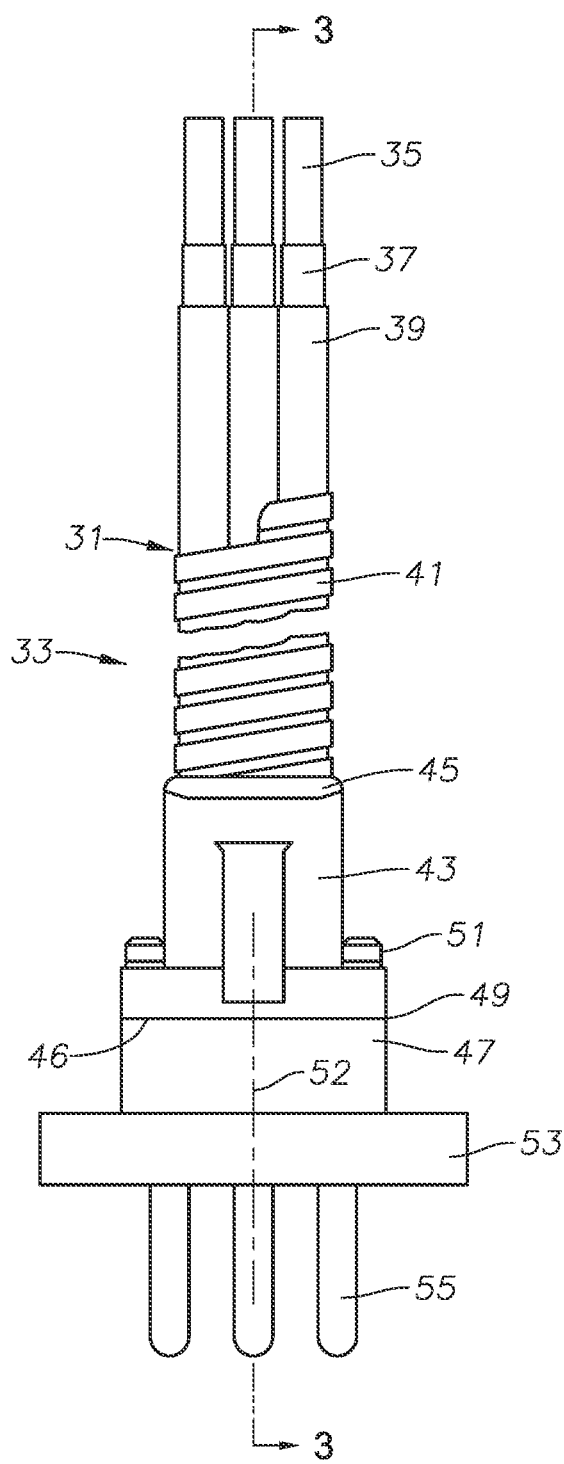
FIG. 2 is an enlarged side view of the motor power connector of FIG. 1.

Referring to FIG. 2, motor lead 31 has three electrical conductors 35, one for each phase of motor 17. Each electrical conductor 35 is a copper wire, either solid or stranded, with one or more insulation layers 37. In some instances, a lead sheath 39 will be extruded around each insulation layer 37 to prevent damage from hydrogen sulfide gas. Motor lead 31 has a flat configuration, with insulated electrical conductors 35 side-by-side. A single plane passes through the axes of the electrical conductors 35. An outer armor 41 comprising a metal strip wraps helically around the three electrical conductors 35.

Power connector 33 may have a variety of configurations, and FIG. 2 is an example of only one configuration. In FIG. 2, power connector 33 has an upper housing 43 with an upper opening 45 into which the lower end of motor lead 31 passes, including armor 41. Upper opening 45 is oblong so as to accommodate the flat assembled lower end of motor lead 31. Upper housing 43 has a cylindrical lower end 46 that defines a flange to secure upper housing 43 to a lower housing 47. Upper housing 43 transitions from its oblong upper opening 45 to its cylindrical lower end 46. Lower housing 47 has an upper end 49 that is cylindrical and abuts upper housing lower end 46. Fasteners 51 extend through holes in the flange at upper housing lower end 46 into threaded holes in lower housing upper end 49 to secure upper housing 43 to lower housing 47. The cylindrical interior of lower housing 47 has a longitudinal axis 52 that extends through upper housing upper opening 45.

Lower housing 47 has a flange 53 on its lower end that is generally elliptical and has bolt holes (not shown) for bolting power connector 33 to motor 17. Electrical terminals 55 joined to the lower ends of electrical conductors 35 protrude downward from flange 53 for engaging mating terminals in a receptacle of motor 17. Although shown as pins, terminals 55 may alternately be female types.

Figure 3:
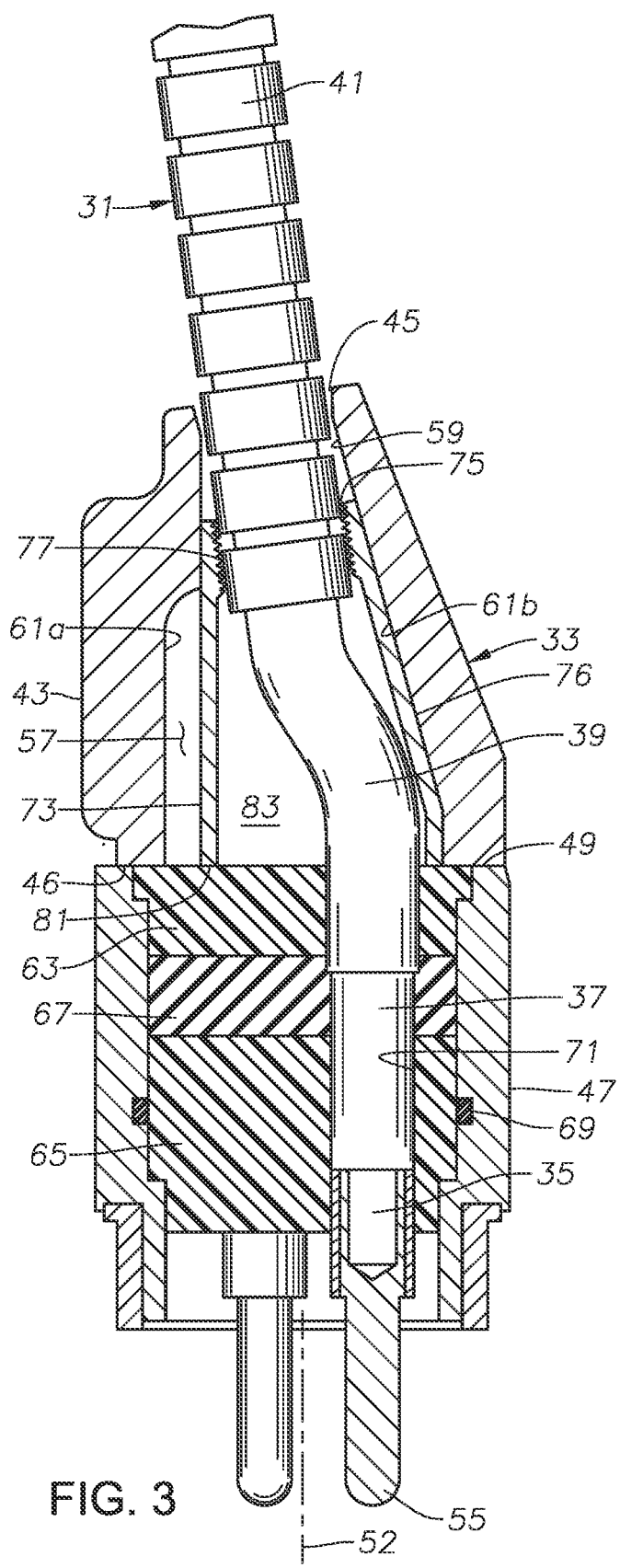
FIG. 3 is a sectional view of the power connector of FIG. 2, taken along the line 3-3 of FIG. 2.

Referring to FIG. 3, power connector upper housing 43 has an interior 57 with a converging upper portion 59 that joins upper opening 45. Converging upper portion 59 has two side wall surfaces 61a, 61b that face each other. The distance between the two facing side wall surfaces 61a, 61b in converging upper portion 59 becomes smaller in an upward direction until reaching upper opening 45. The cross-sectional area of upper portion 59 decreases in an upward direction. Side wall surfaces 61a, 61b may be generally flat. In this example, side wall surface 61a is parallel with axis 52 and side wall surface 61b inclines relative to axis 52 toward side wall surface 61a. A gap between the flat sides of power cable armor 41 and the converging side walls 61a, 61b gradually decreases in an upward direction.

Lower housing 47 has an interior containing at least one cylindrical electrical insulator, and in this example, there are three. Upper insulator 63 and lower insulator 65 are both rigid thermoplastic discs that fit closely in lower housing 47. A cylindrical bulk elastomeric seal 67 that is resilient is sandwiched between upper insulator 63 and lower insulator 65. Lower electrical insulator 65 optionally may have a seal ring 69 that seals between its exterior and an interior side wall of lower housing 47. When secured in lower housing 47, upper and lower insulators 63, 65 squeeze and energize elastomeric seal 67, causing it to seal against the interior of lower housing 47. An alternate embodiment (not shown) employs only one rigid electrical insulator and seal rings that seal the insulator to the lower housing.

Three parallel conductor holes 71 (only one shown) extend through upper insulator 63, elastomeric seal 67 and lower insulator 65. Each of the electrical conductors 35 and its insulation layer 37 extends through one of the conductor holes 71 and joins one of the terminals 55. When energized, elastomeric seal 67 seals around each insulation layer 37.

Figure 4:
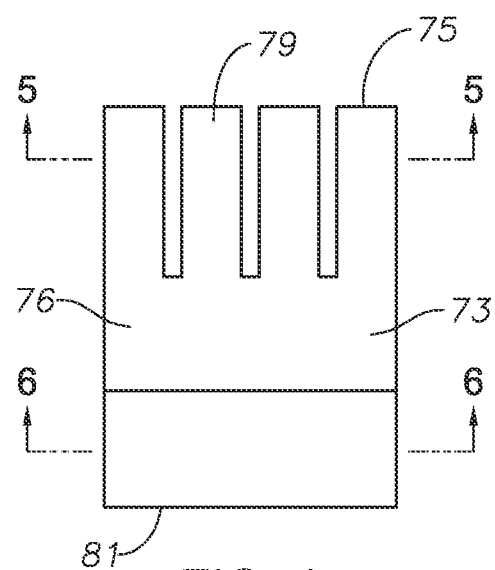
FIG. 4 is a side view of a gripping slips member of the power connector of FIG. 3, shown removed from the connector.
Figure 5:
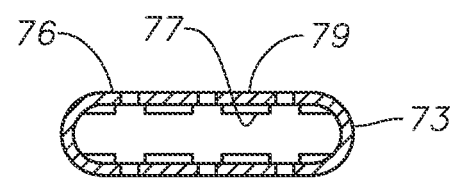
FIG. 5 is an sectional view of the slips member of FIG. 4, taken along the line 5-5 of FIG. 4.

A slips member 73 fits within upper housing interior 57. Slips member 73 has an open upper end potion 75 that slides and wedges into housing upper converging section 59. Slips member upper end portion 75 has a plurality of teeth 77 facing inward toward each other that embed into the opposite facing flat sides of armor 41. Referring also to FIGS. 4 and 5, slips member 73 has a plurality of slots in upper end portion 75, forming collet fingers 79 that can flex inward and outward. As shown in FIG. 5, fingers 79 are located on flat sides 76 of upper end portion 75. Teeth 77 are located on the inner surfaces of fingers 79. Flat sides 76 face each other and converge toward each other in an upward direction. One of the flat sides 76 is parallel with axis 52 and the other inclined at the same inclination as upper housing flat wall surface 61b.

Fingers 79 have a length extending from slips member upper end 75 toward slips member lower end 81 that is selected to assure that fingers 79 resiliently flex inward as the upper portion of slips member 73 is pushed upward into upper housing converging section 59. When slips member 73 is pushed upward in upper housing 43, fingers 79 engage and slide on side wall surfaces 61a, 61b of upper housing converging section 59.

Figure 6:
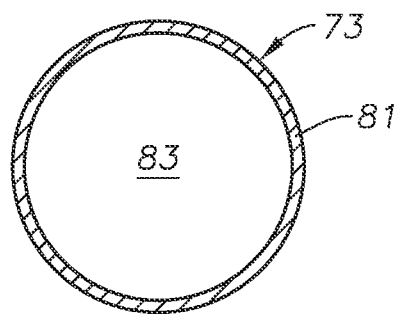
FIG. 6 is a sectional view of the slips member of FIG. 4, taken along the line 5-5 of FIG. 5.

Slips member upper end 75 has an oblong opening, as shown in FIG. 5, to closely receive a lower portion of motor lead 31 in interior 83 of slips member 73. Slips member lower end 81 is circular, as shown in FIG. 6, with slips member interior 83 matching upper housing interior 57. Armor 41 will terminate in slips interior 83 a short distance below teeth 77. Slips member 73 has a conical central portion that transitions from its oblong upper end 75 to its cylindrical lower end 81. While slips member 73 is in its free state prior to being installed in upper housing 43, the cross-sectional area of slips member upper oblong end portion 75 is greater than the cross-sectional area of upper housing oblong upper opening 45.

During manufacturing, slips member 73 will be initially placed in upper housing interior 57, and the lower end of motor lead 31 inserted through slips member 73. The length of slips member 73 from its lower end 81 to its upper end 75 is selected so that during assembly of power connector 33, when slips member upper end 75 is just touching armor 41, slips member lower end 81 will initially protrude past the lower end of upper housing 43. After insulators 63, 65 and 67 and terminals 5 are installed, the technician pushes upper housing lower end 46 against lower housing upper end 49, and secures fasteners 51 (FIG. 2). Slips member lower end 81 will abut upper rigid insulator 63 as upper housing 43 and lower housing 47 are secured together.

The securing step pushes slips member 73 farther upward in upper housing 43, causing its upper end 75 to slide on upper converging side wall surfaces 61a, 61b. This movement deflects fingers 79 and embeds teeth 77 into armor 41. The gripping engagement of slips member 75 with armor 41 firmly secures motor lead 31 to upper housing 43. It is not necessary to fill slips member interior 83 and upper housing interior 57 with epoxy.

The present invention described herein, therefore, is well adapted to carry out the objects and attain the ends and advantages mentioned, as well as others inherent therein. While only one embodiment of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. An electrical power apparatus for an electrical submersible well pump motor, comprising:
    a motor lead having three side-by-side insulated conductors and a metal strip of armor that wraps around the insulated conductors;
    a power connector secured to a lower end of the motor lead for engagement with a receptacle on the motor; the power connector comprising:
    a housing having an upper opening into which the motor lead and a lower portion of the armor extend;
    at least one electrical insulator in the housing, the insulator having a plurality of holes, each receiving one of the insulated conductors; and
    a slips member in engagement with the housing, the slips member having an upper opening into which the lower portion of the armor extends, the slips member having a plurality of fingers with inward protruding teeth that are deflected into gripping engagement with the armor.

2. The apparatus according to claim 1, wherein:
    the upper opening of the slips member has two flat sides that face each other, and the fingers are located in both of the flat sides, wherein the upper opening is on an upper end portion of the slips member, wherein the upper end portion of the slips member has an oval cross section, wherein the slips member comprises a lower end portion that adjoins a lower end of the upper end portion, and wherein the lower end portion has a circular cross section.

3. The apparatus according to claim 1, wherein:
    the slips member is located within an interior of the housing.

4. The apparatus according to claim 1, wherein:
    the housing has an interior with a converging upper portion converging toward the upper opening of the housing;
    the slips member is located in the interior of the housing, and the fingers are wedged into the converging upper portion, which causes the fingers to deflect into the armor.

5. The apparatus according to claim 1, wherein:
    the housing has an interior with two converging side wall surfaces that face and converge toward each other in a direction toward the upper opening of the housing;
    the slips member has two side wall surfaces that are in engagement with the converging side wall surfaces of the housing, the fingers being located in the side wall surfaces of the slips member; and
    downward movement of the housing over the slips member causes the fingers to deflect inward into engagement with the armor.

6. The apparatus according to claim 5, wherein the converging side wall surfaces of the housing and the side wall surfaces of the slips member are flat.

7. The apparatus according to claim 1, wherein the upper opening of the slips member is oblong.

8. The apparatus according to claim 7, wherein the slips member has a lower opening through which the insulated conductors extend, the lower opening being circular.

9. An electrical power apparatus for an electrical submersible well pump motor, comprising:
    a motor lead having three side-by-side insulated conductors and a metal strip of armor that wraps around the insulated conductors;
    a power connector secured to a lower end of the motor lead for engagement with a receptacle on the motor; the power connector comprising:
    an upper housing having an upper opening into which the motor lead and a lower portion of the armor extend, the upper housing having a housing interior with a converging upper portion that gradually decreases in cross-sectional area to the upper opening of the upper housing;
    a lower housing assembly having an upper end that abuts and secures to a lower end of the upper housing, the lower housing assembly having at least one electrical insulator with a plurality of holes, each receiving one of the insulated conductors;
    a slips member having an upper opening into which the lower portion of the armor extends, the slips member having an upper portion with an initial free-state cross-sectional area larger than the cross-sectional area of the upper opening of the upper housing, the upper portion of the slips member having a plurality of fingers with inward protruding teeth, the slips member having a lower end that abuts the upper end of the lower housing assembly; wherein
    the slips member has a length selected such that prior to securing the upper housing to the lower housing assembly, the lower end of the slips member initially protrudes past the lower end of the upper housing while the upper portion of the slips member is touching the converging upper portion of the upper housing; and
    securing the upper housing to the lower housing assembly requires the upper housing to be moved farther downward over the slips member, causing the upper converging portion of the upper housing to deflect the fingers and embed the teeth into the armor.

10. The apparatus according to claim 9, wherein the upper opening of the slips member is oblong.

11. The apparatus according to claim 9, wherein the lower opening of the slips member is circular.

12. The apparatus according to claim 9, wherein the upper opening of the slips member has two flat sides that face and incline toward each other, and the fingers are formed in both of the flat sides.

13. The apparatus according to claim 9, wherein the converging upper portion of the upper housing has two flat surfaces that incline toward each other in an upward direction.

14. The apparatus according to claim 13, wherein:
the lower housing assembly has a longitudinal axis; and
one of the flat surfaces in the converging upper portion of the upper housing is parallel with the axis.

15. The apparatus according to claim 9, wherein:
the at least one electrical insulator in the lower housing comprises a rigid disc extending across the upper end of the lower housing; and
the lower end of the slips member abuts the electrical insulator.

16. An electrical power apparatus for an electrical submersible well pump motor, comprising:
a motor lead having three side-by-side insulated conductors and a metal strip of armor that wraps around the insulated conductors, the armor having two oppositely facing flat sides;
a power connector secured to a lower end of the motor lead for engagement with a receptacle on the motor; the power connector comprising:
an upper housing having an upper end with an oblong upper opening into which the motor lead and a lower portion of the armor extend, the upper housing having a housing interior with a converging upper portion that converges toward the oblong upper opening of the upper housing, the upper housing having an open lower end;
a lower housing having an open upper end that abuts and secures to the open lower end of the upper housing;
a rigid electrical insulator mounted across the open upper end of the lower housing, the insulator having a plurality of holes, each receiving one of the insulated conductors;
a slips member having an open oblong upper opening into which the lower portion of the armor extends, the slips member having a converging upper portion that extends to the oblong upper opening of the slips member and is in flush contact with the converging upper portion of the upper housing, the converging upper portion of the slips member having a plurality of fingers with inward protruding teeth, the slips member having a cylindrical lower end that abuts the insulator in the lower housing; and
wherein pushing the upper housing downward over the slips member to connect the upper housing to the lower housing causes the fingers to deflect inward into gripping engagement with the armor.

17. The apparatus according to claim 16, wherein the converging upper portion of the slips member has two flat surfaces that face and incline toward each other in an upward direction, and the fingers are located in both of the flat surfaces.

18. The apparatus according to claim 16, wherein the converging upper portion of the upper housing has two flat surfaces that incline toward each other in an upward direction.

19. The apparatus according to claim 16, wherein:
the converging upper portion of the slips member has first and second flat surfaces that face and incline toward each other, and the fingers are in both of the first and second flat surfaces;
the lower housing assembly has a longitudinal axis; and
the first flat surface is parallel with the axis.

20. The apparatus according to claim 19, wherein:
the second flat surface is inclined relative to the axis.

* * * * *